United States Patent Office 2,960,525
Patented Nov. 15, 1960

2,960,525

THIONOPHOSPHORIC ACID ESTERS

August Dörken, Wuppertal-Sonnborn, and Gerhard Schrader, Wuppertal-Cronenberg, Germany, assignors to Farbenfabriken Bayer Aktiengesellschaft, Leverkusen, Germany, a corporation of Germany No Drawing. Filed Apr. 1, 1958, Ser. No. 725,495

Claims priority, application Germany Apr. 15, 1957

13 Claims. (Cl. 260—461)

The present invention relates to and has as its objects thiophosphoric acid esters and a method of producing same. Generally the new esters of the present invention correspond to the following formula

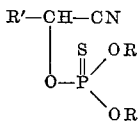

in which R stands for a lower alkyl radical especially such ones up to 4 carbon atoms, and R' stands for hydrogen, alkyl or aryl radicals.

It has been found that highly active insecticidal thionophosphoric acid esters are obtainable by reacting α-hydroxy carboxylic acid nitriles with O.O-dialkyl-thionophosphoric acid chlorides as may be shown by the following equation:

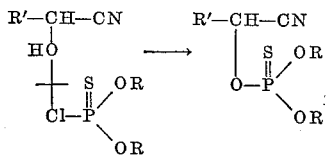

wherein R and R' have the same significance as shown above.

The condensation is preferably carried out in the presence of suitable acid binding agents. Useful acid binding agents are for example tertiary amines, alkali metal alcoholates, potassium carbonate, and the like. As solvents there may especially be mentioned ketones, such as methyl ethyl ketone, further nitriles such as acetonic acid nitrile, then hydrocarbons such as benzene or toluene. The reaction is expediently carried out at elevated temperatures.

The compounds of the present invention are generally valuable insecticides and plant-protecting agents. They kill pests such as aphids, flies and mites and exhibit a very remarkable systemic action. Most remarkable is the action against flies. The application of these compounds should be carried out according to the use of other known phosphor insecticides, i.e. in dilution or solution with solid or liquid carriers such as chalk, talc, bentonite, water, alcohols, liquid hydrocarbons etc. The inventive compounds may further be used in combination with other known insecticides or pesticides, etc. Effective concentrations of the compounds may vary also, generally, concentrations of 0.0001% to 1.0% kill pests effectively. The combinations of the compounds may be sprayed or dusted or otherwise brought in contact with pests or plants to be protected. They may also be used as aerosols.

As an example for the special utility of the inventive compounds the compounds of the following formulae

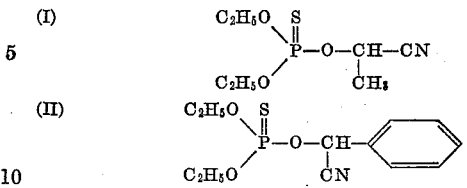

have been tested against flies (Drosophila) and spider mites (*Tetranychus telarius*=two-spotted spider). Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration.

The tests have been carried out in the following manner:

(A) Against flies (Drosophila). In Petri dishes of about 5 inches diameter filter paper has been placed, which has been wetted with aqueous solutions of the above shown active ingredients prepared as indicated above. About 30 flies have been placed under the covered Petri dishes and the living status has been determined after 24 hours. The following killing rate has been obtained:

(I) Solutions of 0.00001% kill flies to 100%,
(II) Solutions of 0.001% kill flies to 100%, (B) Against spider mites (contact-insecticidal action). Bean plants (*Phaseolus vulgaris*) of about 15 inches hight are spread drip wet with 0.1% solutions prepared as indicated above. The bean plants have been infested heavily with the two-spotted spider (*Tetranychus telarius*). Evaluation has been carried out after 24 hours, 48 hours and 8 days. The total percentage of killed pests after 8 days is as follows:

(I) Solutions of 0.1% kill spider mites 100%,
(II) Solutions of 0.001% kill spider mites 50%.

The following examples are given by way of illustration only without, however, limiting the present invention thereto:

Example 1

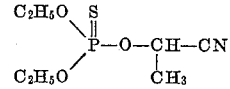

24 grams of α-hydroxypropionic acid nitrile (Houben-Weyl VIII, 277) are mixed with 63 grams of diethylthionophosphoric acid chloride. This mixture is added dropwise with stirring and cooling at 30° C. within about 15 minutes to 27 grams of anhydrous pyridine and the whole is then heated to 45–50° C. for a further 4 hours. The mixture is then diluted with 100 millilitres of methylene chloride and the solution thus obtained is poured onto 200 grams of ice to which 15 millilitres of concentrated hydrochloric acid has been added. The methylene layer is separated, washed twice with 25 millilitres portions of water and then dried over sodium sulfiate. After filtration, the solvent is distilled off under vacuum. 33 grams of a colorless oil remain which distills at 57–58° C./0.01 mm. Hg. Yield 44% of the theoretical.

Calculated for mol 223.2:
P 13.9%, S 14.4%, N 6.25%.
P 14.0%, S 14.9%, N 6.13%.
LD$_{50}$ on rats orally: 100 mg./kg.

0.00001% solutions kill flies to 100%. Spider mites are killed to 100% with 0.1% solutions.

By exactly the same way there may be obtained the esters of the following formulae:

$$\begin{array}{c}CH_3O\\ \phantom{CH_3O}\diagdown\\ \phantom{CH_3O}\phantom{\diagdown}P\\ \phantom{CH_3O}\diagup\phantom{P}\\ CH_3O\end{array}\begin{array}{c}S\\ \|\\ \phantom{P}\text{—O—CH—CN}\\ \phantom{P}\phantom{\text{—O—}}|\\ \phantom{P}\phantom{\text{—O—C}}CH_3\end{array}$$

$$\begin{array}{c}isoC_3H_7O\\ \phantom{iso}\diagdown\\ \phantom{iso}P\\ \phantom{iso}\diagup\\ isoC_3H_7O\end{array}\begin{array}{c}S\\ \|\\ \phantom{P}\text{—O—CH—CN}\\ \phantom{P}\phantom{\text{—O—}}|\\ \phantom{P}\phantom{\text{—O—C}}CH_3\end{array}$$

$$\begin{array}{c}nC_3H_7O\\ \phantom{n}\diagdown\\ \phantom{n}P\\ \phantom{n}\diagup\\ nC_3H_7O\end{array}\begin{array}{c}S\\ \|\\ \phantom{P}\text{—O—CH—CN}\\ \phantom{P}\phantom{\text{—O—}}|\\ \phantom{P}\phantom{\text{—O—C}}CH_3\end{array}$$

*Example 2*

$$\begin{array}{c}C_2H_5O\\ \phantom{C_2H_5}\diagdown\\ \phantom{C_2H_5}P\\ \phantom{C_2H_5}\diagup\\ C_2H_5O\end{array}\begin{array}{c}S\\ \|\\ \phantom{P}\text{—O—CH}_2\text{—CN}\end{array}$$

23 grams of glycolic and nitrile (0.4 mol) are stirred with 76 grams of diethyl thionophosphoric acid chloride and treated with 33 grams of anhydrous pyridine at 20–25° C. whilst vigorously stirring. The mixture is stirred at 30° C. for another 6 hours and allowed to stand at room temperature for 2 days. The pyridine hydrochloride thus formed is removed by filtration. The filtrate is poured onto 100 grams of ice to which 15 millilitres of concentrated hydrochloric acid has been added. The mixture is treated with 60 millilitres of methylene chloride, shaken and the methylene layer is separated from water. The methylene chloride solution is dried over sodium sulfate. Sodium sulfate is then filtered off and the solvent is removed by distillation under vacuum. 51.2 grams of the new ester of B.P. 62–64° C./0.01 mm. Hg are obtained as a water-insoluble colorless oil. Yield 61.5% of the theoretical.

Calculated for mol 209.2:
P 14.9%, S 15.4%, N 6.7%.
P 15.0%, S 15.8%, N 6.4%.
$LD_{50}$ on rats orally: 100 mg./kg.

By exactly the same way there may be obtained the esters of the following formulae:

$$\begin{array}{c}CH_3O\\ \phantom{CH_3}\diagdown\\ \phantom{CH_3}P\\ \phantom{CH_3}\diagup\\ CH_3O\end{array}\begin{array}{c}S\\ \|\\ \phantom{P}\text{—O—CH}_2\text{—CN}\end{array}$$

$$\begin{array}{c}C_3H_7O\\ \phantom{C_3}\diagdown\\ \phantom{C_3}P\\ \phantom{C_3}\diagup\\ C_3H_7O\end{array}\begin{array}{c}S\\ \|\\ \phantom{P}\text{—O—CH}_2\text{—CN}\end{array}$$

*Example 3*

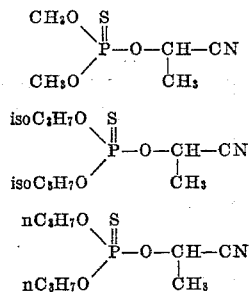

To a mixture of 34 grams of freshly distilled mandelic acid nitrile and 47 grams of diethyl thionophosphoric acid monochloride there are added dropwise with stirring and cooling 21 grams of pure pyridine within 20 minutes. The mixture is then heated to 30° C. for another 16 hours. The reaction product is diluted with 60 millilitres of methylene chloride and poured onto 100 grams of ice to which 15 millilitres of concentrated hydrochloric acid had been added. The methylene chloride solution is separated and dried over sodium sulfate. Upon distilling off the solvent 61.5 grams of the new ester are obtained as a pale yellow water-insoluble oil. The ester can be distilled under vacuum with decomposition only. Yield 86% of the theoretical.

Calculated for mol 285.3:
P 10.8%, S 11.2%, N 4.9%.
P 10.8%, S 11.1%, N 4.6%.
$LD_{50}$ on rats orally: 10 mg./kg.

By the same way there may be obtained the esters of the following formulae:

$$\begin{array}{c}CH_3O\\ \phantom{CH_3}\diagdown\\ \phantom{CH_3}P\\ \phantom{CH_3}\diagup\\ CH_3O\end{array}\begin{array}{c}S\\ \|\\ \phantom{P}\text{—O—CH—}\phantom{xx}\\ \phantom{P}\phantom{\text{—O—}}|\\ \phantom{P}\phantom{\text{—O—C}}CN\end{array}\!\!\bigcirc$$

$$\begin{array}{c}C_3H_7O\\ \phantom{C_3}\diagdown\\ \phantom{C_3}P\\ \phantom{C_3}\diagup\\ C_3H_7O\end{array}\begin{array}{c}S\\ \|\\ \phantom{P}\text{—O—CH—}\phantom{xx}\\ \phantom{P}\phantom{\text{—O—}}|\\ \phantom{P}\phantom{\text{—O—C}}CN\end{array}\!\!\bigcirc$$

*Example 4*

$$\begin{array}{c}C_2H_5O\\ \phantom{C_2H_5}\diagdown\\ \phantom{C_2H_5}P\\ \phantom{C_2H_5}\diagup\\ C_2H_5O\end{array}\begin{array}{c}S\\ \|\\ \phantom{P}\text{—O—CH—CN}\\ \phantom{P}\phantom{\text{—O—}}|\\ \phantom{P}\phantom{\text{—O—C}}C_2H_5\end{array}$$

34.5 grams of α-hydroxybutyric acid nitrile (B.P. 79° C./5 mm. Hg) are mixed with 76 grams of diethyl thionophosphoric acid chloride. To this mixture there are added dropwise with stirring and cooling 33 grams of anhydrous pyridine at about 30° C. within 5 minutes. The mixture is after-stirred at 40–45° C. for 8 hours, treated, after cooling with 100 millilitres of methylene chloride and washed with ice water to which 15 millilitres of concentrated hydrochloric acid had been added. The separated organic layer is washed twice with small quantities of water until neutral, dried over sodium sulfate and the solvent is then distilled off under vacuum. The residue is distilled under high vacuum. 37 grams of the new ester are obtained as a clear pale yellow oil, B.P. 62–66° C./0.01 mm. Hg. Yield 39% of the theoretical.

By exactly the same way there may be obtained the ester of the following formula $$\begin{array}{c}CH_3O\\ \phantom{CH_3}\diagdown\\ \phantom{CH_3}P\\ \phantom{CH_3}\diagup\\ CH_3O\end{array}\begin{array}{c}S\\ \|\\ \phantom{P}\text{—O—CH—CN}\\ \phantom{P}\phantom{\text{—O—}}|\\ \phantom{P}\phantom{\text{—O—C}}C_2H_5\end{array}$$

We claim:

1. Thionophosphoric acid esters of the formula $$\begin{array}{c}R'\text{—CH—CN}\\ |\\ O\text{—P}\begin{array}{c}S\\ \|\end{array}\!\!\begin{array}{c}OR\\ \diagup\\ \diagdown\\ OR\end{array}\end{array}$$

wherein R stands for a lower alkyl radical having up to 4 carbon atoms, and R' stands for a member selected from the group consisting of hydrogen, a lower alkyl radical having up to 4 carbon atoms and a phenyl radical.

2. The thionophosphoric acid ester of the following formula $$\begin{array}{c}C_2H_5O\\ \phantom{C_2H_5}\diagdown\\ \phantom{C_2H_5}P\\ \phantom{C_2H_5}\diagup\\ C_2H_5O\end{array}\begin{array}{c}S\\ \|\\ \phantom{P}\text{—O—CH—CN}\\ \phantom{P}\phantom{\text{—O—}}|\\ \phantom{P}\phantom{\text{—O—C}}CH_3\end{array}$$

3. The thionophosphoric acid ester of the following formula $$\begin{array}{c}CH_3O\\ \phantom{CH_3}\diagdown\\ \phantom{CH_3}P\\ \phantom{CH_3}\diagup\\ CH_3O\end{array}\begin{array}{c}S\\ \|\\ \phantom{P}\text{—O—CH—CN}\\ \phantom{P}\phantom{\text{—O—}}|\\ \phantom{P}\phantom{\text{—O—C}}CH_3\end{array}$$

4. The thionophosphoric acid ester of the following formula $$\begin{array}{c}isoC_3H_7O\\ \phantom{iso}\diagdown\\ \phantom{iso}P\\ \phantom{iso}\diagup\\ isoC_3H_7O\end{array}\begin{array}{c}S\\ \|\\ \phantom{P}\text{—O—CH—CN}\\ \phantom{P}\phantom{\text{—O—}}|\\ \phantom{P}\phantom{\text{—O—C}}CH_3\end{array}$$

5. The thionophosphoric acid ester of the following formula

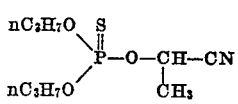

6. The thionophosphoric acid ester of the following formula

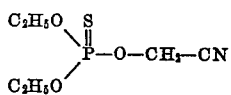

7. The thionophosphoric acid ester of the following formula

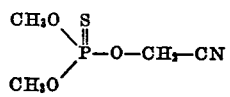

8. The thionophosphoric acid ester of the following formula

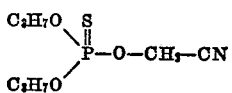

9. The thionophosphoric acid ester of the following formula

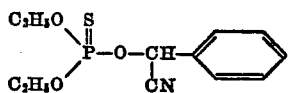

10. The thionophosphoric acid ester of the following formula

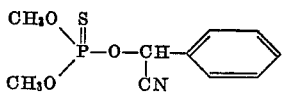

11. The thionophosphoric acid ester of the following formula

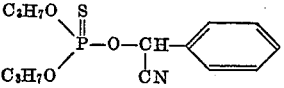

12. The thionophosphoric acid ester of the following formula

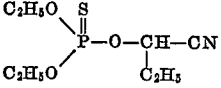

13. The thionophoshoric acid ester of the following formula

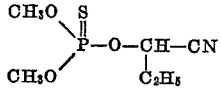

References Cited in the file of this patent

UNITED STATES PATENTS

| | | |
|---|---|---|
| 2,494,283 | Cassaday et al. | Jan. 10, 1950 |
| 2,494,284 | Cassaday et al. | Jan. 10, 1950 |
| 2,829,111 | Schrader | Apr. 1, 1958 |

FOREIGN PATENTS

| | | |
|---|---|---|
| 1,024,509 | Germany | Feb. 20, 1958 |

UNITED STATES PATENT OFFICE
CERTIFICATION OF CORRECTION

Patent No. 2,960,525                          November 15, 1960

August Dörken et al.

It is hereby certified that error appears in the above numbered patent requiring correction and that the said Letters Patent should read as corrected below.

Column 3, line 24, for "and" read -- acid --.

Signed and sealed this 30th day of May 1961.

(SEAL)
Attest:

ERNEST W. SWIDER                          DAVID L. LADD
Attesting Officer                            Commissioner of Patents